United States Patent [19]

McGlynn

[11] 4,116,064
[45] Sep. 26, 1978

[54] DISPOSABLE TAPE CORD THERMOMETER

[75] Inventor: John F. McGlynn, White Plains, N.Y.

[73] Assignee: IPCO Hospital Supply Corporation, White Plains, N.Y.

[21] Appl. No.: 838,899

[22] Filed: Oct. 3, 1977

Related U.S. Application Data

[63] Continuation-in-part of Ser. No. 594,218, Jul. 9, 1975.

[51] Int. Cl.² ............................................. G01K 7/16
[52] U.S. Cl. .............................. 73/362 AR; 338/22 R; 338/26; 338/30
[58] Field of Search ....... 73/362 R, 362 AR, 362 SC; 338/22 R, 25, 26, 28, 30, 214

[56] References Cited

U.S. PATENT DOCUMENTS

| 3,681,993 | 8/1972 | Campton et al. ............. 73/362 AR |
| 3,949,609 | 4/1976 | Hammerslag ................... 73/362 AR |
| 4,072,848 | 2/1978 | Johnson et al. .................... 338/22 R |

Primary Examiner—Stephen A. Kreitman
Attorney, Agent, or Firm—Holland, Armstrong, Wilkie & Previto

[57] ABSTRACT

A tape cord thermometer in which a disposable tape acts as the conducting means between a thermometer probe and a reading device.

38 Claims, 23 Drawing Figures

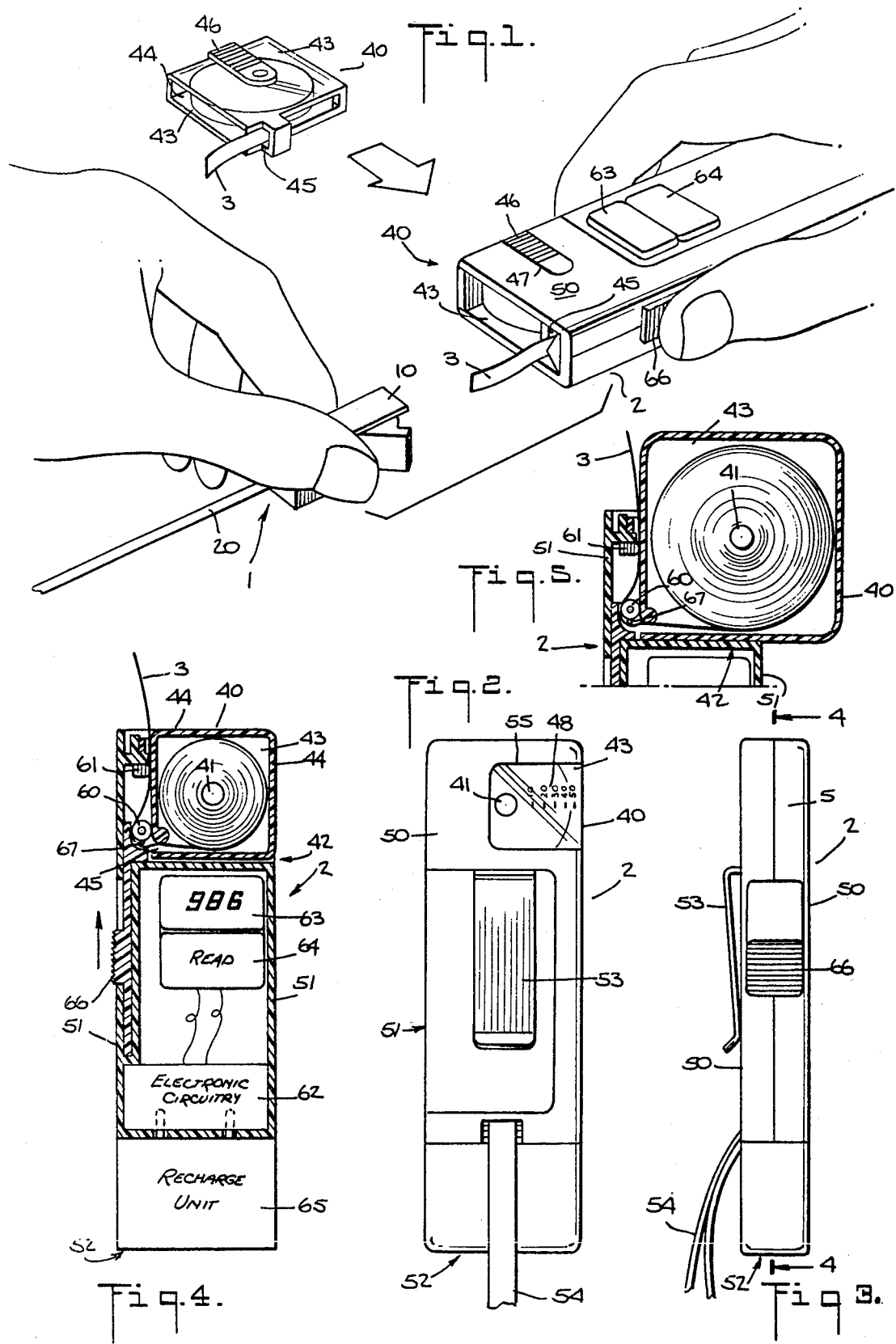

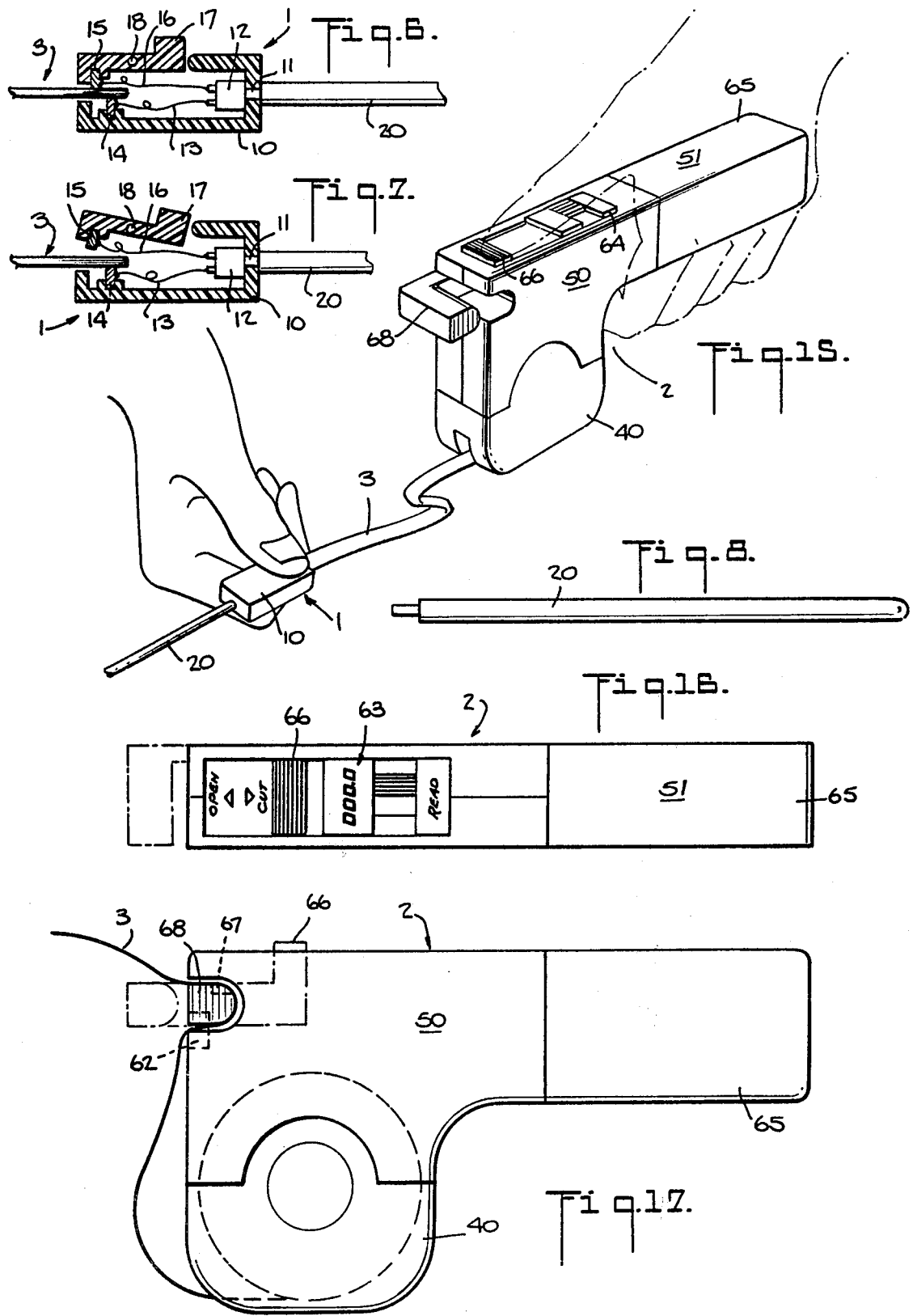

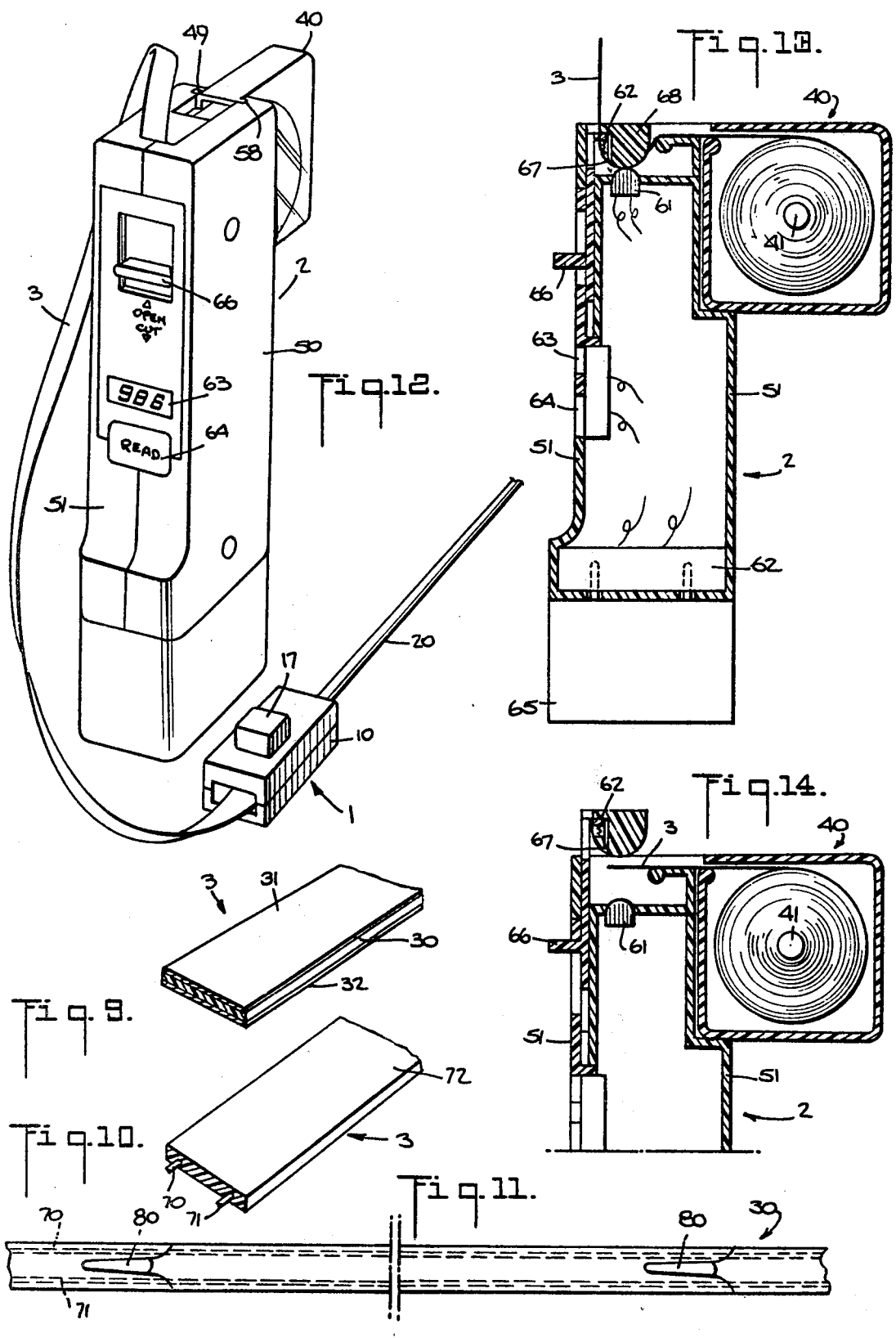

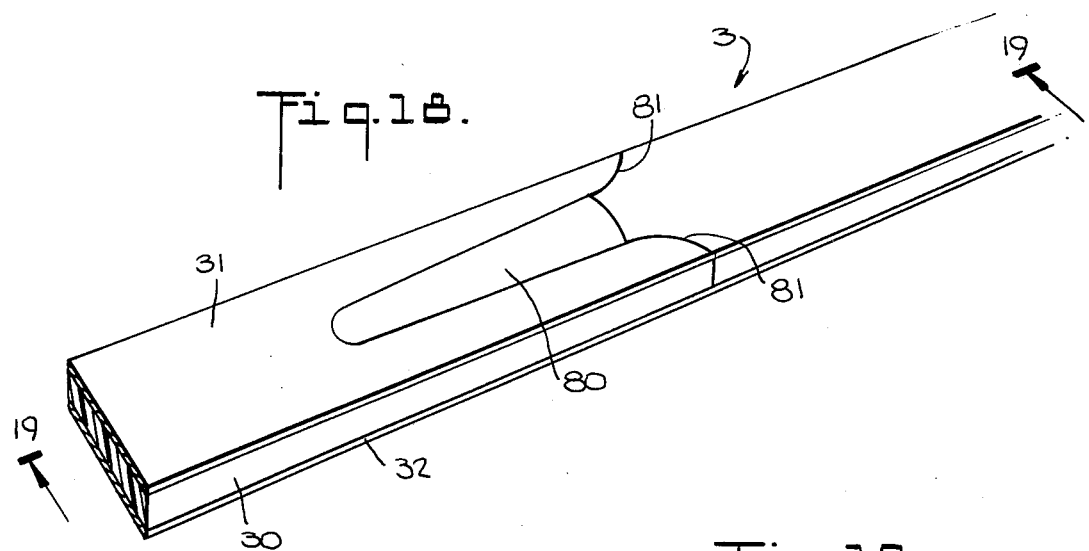
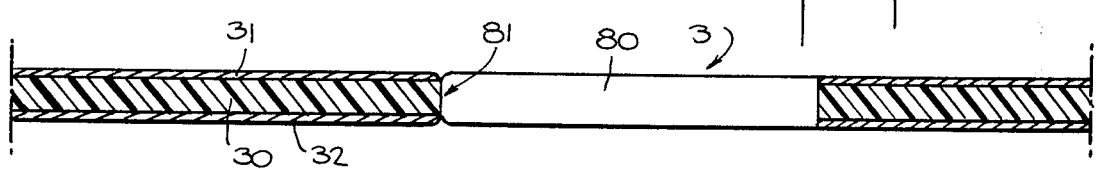
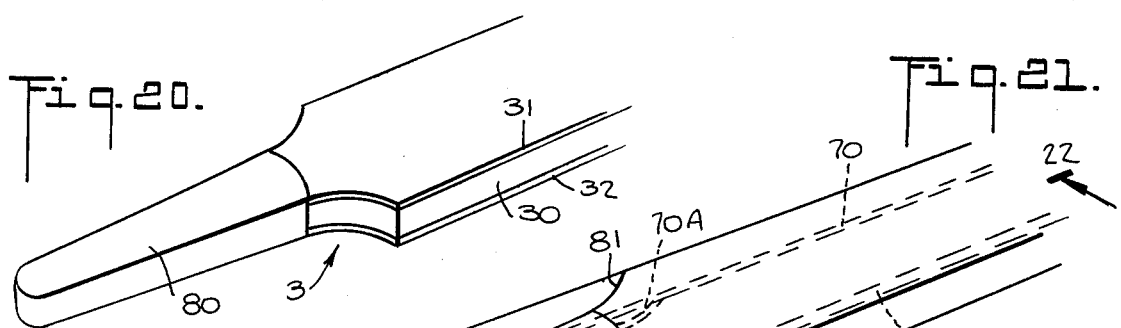
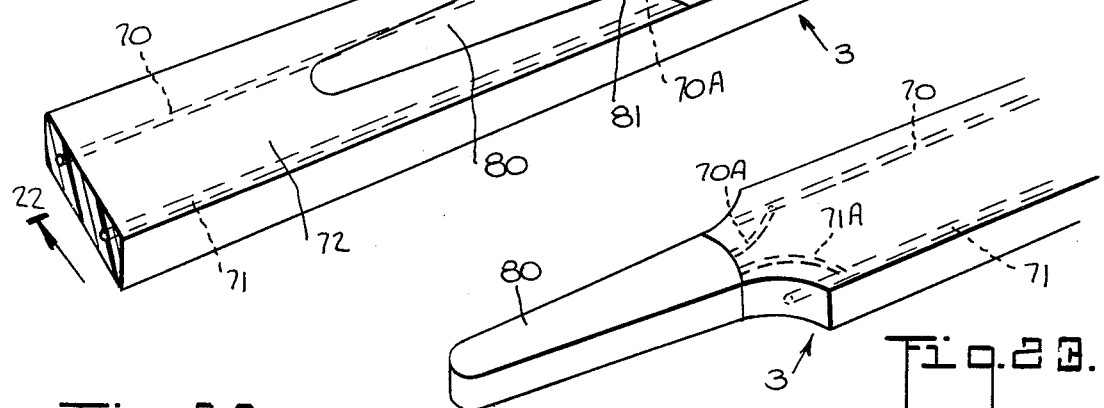
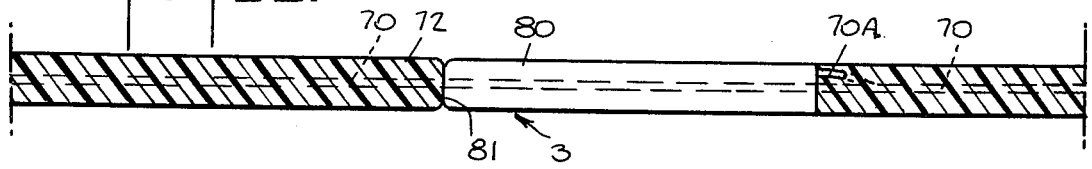

DISPOSABLE TAPE CORD THERMOMETER

CROSS-REFERENCE

This is a continuation-in-part of pending United States Patent Application Ser. No. 594,218 filed July 9, 1975.

DESCRIPTION

The present invention relates to a thermometer and more particularly to a thermometer which has the probe mounted at one end of a disposable tape and a reading device mounted at the other end of the disposable tape.

For ease in description, the invention will be described with particular reference to a thermometer and specifically in connection with a clinical thermometer adapted to sense human or animal temperatures. However, it will be understood that the invention may be used to sense conditions other than temperatures such as pressure, radiation, light, etc.

The invention herein comprises a probe which detects the temperature, a reading device to read the temperature detected and a disposable tape to which the probe and the reading device is connected for transmitting the temperature data from the probe to the reader unit.

The present invention is particularly adapted to minimize contamination of hospital temperature sensing mechanisms especially. The invention comprises a system where a patient's temperature is taken electronically by a mechanism which includes a probe assembly, a tape assembly and a reader assembly. Since the probe and the tape come into intimate contact with the patient when the patient's temperature is taken, it is desirable to minimize contamination of these parts as the hospital attendant moves from one patient to another, taking each's temperature. Hence, according to the invention, the tape is severable and disposable and the probe unit is also capable of being disposed of or changed and/or sterilized after each use.

One of the objects of the present invention is the provision of an improved sensing device in which the disposable tape acts as the conductor of the impulses.

Another object of the present invention is the provision of improved means whereby the tape may be easily severed after use and replaced with new tape.

Another object of the present invention is the provision of an improved conducting tape.

Another object of the present invention is the provision of an improved reading unit for reading impulses detected by a probe.

Another object of the present invention is the provision of an improved thermometer in which the probe is easily replaceable.

Another object of the present invention is the provision of an improved thermometer in which the tape is in a cartridge which is removably mounted in the reading unit.

Another object of the present invention is the provision of an improved tape in which the probe is built into the tape and is discarded with the tape.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is an exploded perspective view showing the present invention;

FIG. 2 is a side view of the reader unit of the present invention;

FIG. 3 is an end view of the reader unit;

FIG. 4 is a sectional view taken along line 4—4 of FIG. 3;

FIG. 5 is a fragmentary detailed sectional view of a different embodiment of the invention embodying a magazine of a different size;

FIG. 6 is a sectional view of the probe unit in its operative position;

FIG. 7 is a similar sectional view showing the probe unit in its inoperative position;

FIG. 8 is an elevational view showing the removable probe of the present invention;

FIG. 9 is a cross-sectional perspective view of the tape used with the present invention;

FIG. 10 is a cross-sectional perspective view of another embodiment of a tape which may be used with the present invention;

FIG. 11 is an elevational view showing a tape in which a probe is incorporated therewithin;

FIG. 12 is a perspective view of another embodiment of the present invention;

FIG. 13 is a sectional view of the embodiment shown in FIG. 12 showing the parts in their operative positions;

FIG. 14 is a fragmentary sectional view similar to FIG. 13 showing the parts in their inoperative positions.

FIG. 15 is a perspective view of another embodiment of the invention;

FIG. 16 is a top view thereof; and

FIG. 17 is a side elevational view thereof.

FIG. 18 is a perspective view showing one way in which the probe may be embedded in the tape of FIG. 11.

FIG. 19 is a sectional view taken along line 19—19 of FIG. 18.

FIG. 20 shows the probe after the used portion of the tape has been severed.

FIG. 21 shows a perspective view showing another embodiment in which the probe is imbedded in the tape.

FIG. 22 is a sectional view taken along line 22—22 of FIG. 21.

FIG. 23 is a perspective view showing the exposed probe.

Referring to FIGS. 1 to 5 of the drawings, the present invention embodies a probe unit 1 and a reader unit 2 connected together by flexible conducting tape 3.

The probe unit 1 comprises an outer casing 10 having a probe-receiving opening 11 in its front wall into which a probe 20 may be removably mounted. The probe 20 is inserted into a socket unit 12 which may be connected by a lead wire 13 to a stationary contact 14 and to a movable contact 15 by another lead wire 16. The movable contact 15 is mounted on a snap button or clip 17 which moves relative to the casing 10 around the pivot 18.

The probe 20 is preferably an elongated unit as shown in FIG. 8 which is preferably a resistance thermistor and which is threadedly or otherwise mounted within the socket unit 12 in the casing 10 through opening 11. After use (especially if used as a clinical thermometer)

the probe 20 can either be removed and sterilized or removed and discarded, as the case may be. It will, of course, be understood that if desired, the probe 20 need not be made removable, in which event the probe 20 with the casing 10 would have to be sterilized after use, if used as a clinical thermometer.

The tape 3 which may be used with the present invention is shown in FIG. 9 and is a flexible conducting tape comprising a layer of plastic insulating material 30, such as mylar, interposed between layers 31 and 32 of a conducting material, such as metallic foil. It will be understood that insulating and conducting layers of other materials may also be used, if desired.

When one end of the tape 3 is inserted into the casing 10 of the probe unit 1, one metallic layer 31 will come into contact with the stationary contact 14 and the other layer will be placed into contact with the movable contact 15 when the snap button 17 is closed. Hence, when the tape 3 is in place, an electrical path is closed from the probe 20 through the tape 3 to the reader unit 2.

The tape 3 is preferably mounted within a cartridge 40 on a spindle 41. The cartridge 40 is mounted within the reader unit 2 and comprises a pair of side walls 43 and a plurality of end walls 44 one of which has an opening 45 therein through which the tape 3 may be unwound. One side wall 43 is preferably provided with a push button 46 slidable in slot 47 for ease in permitting the cartridge 40 to be removably mounted within the reader unit 3. The other side wall 43 of cartridge 40 may preferably have indicia 48 therein to indicate the amount of tape 3 left in the cartridge 40.

The reader unit 2 comprises a pair of side walls 50, a pair of end walls 51, and a bottom wall 52. The usual pocket clip 53 and wrist strap 54 may also be provided. The top of the reader unit 2 has a socket 42 to receive the cartridge 40 and has slots 47 and 55 on the opposed side walls 50 to accommodate the push button 46 of the cartridge 40 and to permit the indicia 48 of the cartridge 40 to show therethrough. When the tape cartridge 40 is to be removed, the push button 46 and the other side 43 of the cartridge is grasped through the two slits 47 and 55 so that the cartridge 40 can be easily removed and replaced with a new cartridge 40.

The reader unit 2 comprises a pair of contacts such as 60 and 61, with which opposed conducting layers 31 and 32 makes contact and which are electrically connected to an electronic unit 62. Preferably, a display unit 63 is connected to the electronic unit 62 which is activated by a depressable read button 64. When the temperature is to be read, the button 64 is depressed and the temperature is displayed on dispay 63. Alternately, the temperature can be recorded on a permanent recording. A recharge unit 65, such as a battery may be used to provide power to the unit.

When a particular temperature has been taken, the tape 3 is cut by a cutter 67 adjacent contact 60 which is brought into contact with tape 3 by moving a cut button 66 upwardly to move tape 3 up against cutter 67 as shown in FIG. 3.

FIG. 5 shows a reader unit 2 in which the cartridge 40 is larger than the cartridge 40 shown in FIGS. 1 to 4 so that it extends slightly beyond the socket 42 in the reader unit 2, preferably, the same reader unit 2 will accommodate both large and small cartridges as may be desired.

FIG. 10 shows a modified tape 3 which may be used with the present invention. The conducting wires or units 70 and 71 are imbedded within a ribbon of insulating material 72 in spaced relationship to each other. The tape in this particular embodiment is as flexible as the tape shown in FIG. 9 and may be used in substantially the same manner as the tape shown in FIGS. 1 to 9.

FIG. 11 shows a different embodiment of the present invention in which the tape 3 (whether it be the laminated type shown in FIG. 9 or the imbedded conductor type shown in FIG. 10) has a plurality of probes 80 imbedded therein at spaced intervals. With this embodiment, the probe unit 20 of FIGS. 1 to 8 may be eliminated. Contact with spaced probe units 80 is made either by the spaced laminates 31 and 32 of FIG. 9 or by the imbedded conductors 70 and 71 of FIG. 10, as shown in broken lines in FIG. 11.

In the embodiment of FIG. 11, the tape 3 is severed around the probe 80 along severing lines 81 in order to expose the probe 80 to be used. The electrical impulses will be conducted through the tape conducting elements (either 31-32 of FIG. 9 or 70-71 of FIG. 10) to the reader in a manner similar to the embodiment as described in FIGS. 1 to 8.

Referring more particularly to FIG. 11 which shows the probe 80 embedded within the tape 30 at spaced intervals, the manner of severing the probe around the severing lines 81 will now be described. The severing lines 81 follow the contour of the probe as shown in FIG. 11 and extend beyond the probe to both edges of the tape 30.

If the tape is constructed as shown in FIG. 9, with the conductive laminates 31 and 32 having the insulating material 30 interposed therebetween, then each laminate 32 would have a portion in contact with the probe 80. The severing lines 81 would then comprise lines of weakness or reduced thickness which could be easily severed by the user as is well know in the art, for example, in laminated packages which are opened by severing along lines of weakness in the lamination. In this instance, the severing lines 81 would permit the user to separate the used portion with the used probe 80 embedded therein from the unused portion of the tape to expose a fresh probe by severing along the lines 81.

If the tape of FIG. 11 is constructed as shown in FIG. 10, then each probe 80 would have interior electrical connections to each conductor 70-71. The severing lines 81 would be lines of weakness in the tape 30 which would conform to the shape of the probe 80. In addition, the conductors 70-71 would be severable at the severing line 81 so that the used portion of the tape could be removed from the fresh portion of the tape and a new probe 80 uncovered.

As shown in FIGS. 18 to 20, which further clarify the structure of FIG. 11, the probe 80, which may comprise a thermistor, is imbedded within the tape 3 and is in contact with the laminated conductors 31 and 32. The tape 3 with probe 80 is rolled around in a tape spool assembly similar to the tape spool assembly 40-44 shown in FIGS. 1 to 8 and for this purpose the probe 80 may have some flexibility. Dividing lines 81 are formed in the tape 3 which follow the contour of the probe 80. These dividing lines 81 permit the tape 3, including conductors 31-32, to be severed along these dividing lines 81 to permit the used tape to be discarded and to expose a fresh probe 80 for use on a different patient. The probe 80 remains in conducting contact with the conductors 31-32 after severance. The dividing lines 81 may be severed by any manually operable cutter (not shown) or they may be lines of weakness which permit the tape 3, as well as the laminated electrodes 31 and 32, to be severed manually. In either event, the exposed probe 80 may then be used on a patient and after use the tape is severed around lines 81 to expose a fresh probe 80 and a fresh length of tape 3 is unwound from the tape assembly 40-44 so that a fresh probe 80 may be used on another patient.

As further shown in FIGS. 21 to 23, which still further clarify the structure of FIG. 11, the probe 80, which may also comprise a thermistor, is imbedded within the tape 3 and is in contact with the imbedded conductors 70 and 71 by means of connectors 70A and 70B, respectfully. The tape 3 with probe 80 is rolled around in a tape spool assembly similar to the tape spool assembly 40-44 shown in FIGS. 1 to 8 and for this purpose the probe 80 may have some flexibility. Dividing lines 81 are formed in the tape 3 which follow the contour of the probe 80. These dividing lines 81 permit the tape 3, including conductors 70-71, to be severed along dividing lines 81 to permit the used tape 3 to be discarded and to expose a fresh probe 80 for use on a different patient. However, the connectors 70A and 71A remain in conducting contact with probe 80 and conductors 70-71 after serverance of the tape. The dividing lines 81 may be severed by any manually operable cutter (not shown) or they may be lines of weakness which permit the tape 3, as well as the laminated electrodes 70 and 71, to be severed manually. In either event, the exposed probe 80 may then be used on a patient and after use the tape is severed around lines 81 to expose a fresh probe 80 and a fresh length of tape 3 is unwound from the tape assembly 40-44 so that a fresh probe 80 may be used on another patient.

With this construction, the tape cartridge 40 is mounted in the reader unit 21 and the tape 3 is unwound. The tape 3 is clipped to the contacts 14-15 within the probe unit 1 and the casing 10 has a fresh probe 20 mounted thereon. When the probe 20 is inserted in a patient or animal, the temperature units are sensed by the probe 20 and conducted to the electric circuits in reader unit 2 through the tape 3.

A reader button 64 may be activated to display the temperature through the display unit 63. When this operation is completed, the tape 3 may be severed and discarded and a fresh length of tape 3 is unwound from the cartridge 40 and placed in the probe unit 1 so that the temperature of another patient can be taken. The probe 20 itself will be removed and replaced with a fresh probe with the used probe either discarded or sterilized. Hence, whenever the temperature is taken of each patient, the temperature sensing units will be free of any contamination.

FIGS. 12 to 14 show a different embodiment of the present invention. In this embodiment, the cartridge 40 is slightly different in that it has a key 49 adapted to enter a slot 58 in the top of a reader unit 2. The reader unit 2 has movable and stationary contacts 60 and 61, respectively, between which the tape 3 is clamped and a knife 67 is provided and operated by button 66 for severing the tape 3. A clamp head 68 is operatively connected to the button 66 so that movement of button 66 moves the clamp head 68 to clamp or release a tape or can move the knife 67 to cut the tape. In all other respects, the structure and operation of the embodiment described in FIGS. 1 to 9.

FIGS. 15 to 17 show still another embodiment of the present invention. The reader unit 2 is in the form of a pistol grip which has a tape cartridge 40 adapted to be removably snapped thereon. The reader unit 2 has the movable and stationary contacts 60 and 61 and a clamp head 68 connected to button 66. There is also a knife 67 on clamp head 68 to sever the tape where desired. The operation of this embodiment is similar to that of the two other embodiments, described above.

It will thus be seen that the present invention provides a sensing device in which a disposable tape acts as a conductor and may be easily severed and replaced with a new tape and adapted to be used with a reading unit for reading the impulses being detected by the probe and being transmitted to it by the tape and in which the probe is easily replaceable with the tape wound on a cartridge which is removably mounted in the reading unit.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are as defined as follows:

1. An electronic sensing assembly comprising: a plurality of sensing probes mounted in a disposable and severable electrically conductive tape in spaced relationship to each other, a cartridge for housing a supply of said tape, a reader unit comprising means for housing said cartridge, means for electrically contacting a portion of said tape proximate the cartridge with powered electronic circuitry and indicating means, said tape being severable at said probe to expose the probe and permit used tape portions to be discarded and means permitting withdrawal of additional lengths of tape, whereby a fresh length of tape and a fresh probe can be withdrawn for each use of said sensing probe after severing the former length which was subject to a prior use.

2. A sensing assembly as claimed in claim 1, wherein said tape comprises a pair of conducting elements disposed lengthwise thereto and an insulating element electrically insulating the conducting elements.

3. A sensing assembly as claimed in claim 2, wherein each of said probes is in conducting relationship to said conducting elements.

4. A sensing assembly as claimed in claim 3, wherein severing lines are provided in the tape to permit the tape to be severed along these lines.

5. A sensing assembly as claimed in claim 4, wherein said severing lines follow the contour of said probe.

6. A sensing assembly as claimed in claim 5, wherein said severing lines are lines of weakness adapted to permit the tape to be severed therealong.

7. A sensing assembly as claimed in claim 3, wherein said conducting elements comprises a pair of laminated layers separated by an insulating layer.

8. A sensing assembly as claimed in claim 7, wherein severing lines are provided in the tape to permit the tape to be severed along these lines.

9. A sensing assembly as claimed in claim 8, wherein said severing lines follow the contour of said probe.

10. A sensing assembly as claimed in claim 9, wherein said severing lines are lines of weakness adapted to permit the tape to be severed therealong.

11. A sensing assembly as claimed in claim 3, wherein said conducting elements comprises a pair of conducting units imbedded within an insulating layer.

12. A sensing assembly as claimed in claim 11, wherein severing lines are provided in the tape to permit the tape to be severed along these lines.

13. A sensing assembly as claimed in claim 12, wherein said severing lines follow the contour of said probe.

14. A sensing assembly as claimed in claim 13, wherein said severing lines are lines of weakness adapted to permit the tape to be severed therealong.

15. A sensing assembly as claimed in claim 1, wherein said reader unit comprises a cartridge receiving element, means for electrically contacting the tape, electrical circuitry for reading an impulse from said tape, and means for severing the tape.

16. A sensing assembly as claimed in claim 15, wherein a socket is provided in the reading unit to receive the cartridge.

17. A sensing assembly as claimed in claim 16, wherein said socket has a key-shaped slot to receive a cartridge with a key-shaped element.

18. A sensing assembly as claimed in claim 17, wherein said reader unit has a slot along one wall to receive a button.

19. A sensing assembly as claimed in claim 18, wherein said reader unit has an opening on another wall to permit indicia to show therethrough.

20. A sensing assembly as claimed in claim 19, wherein said reader unit has a pair of electrical contacts adapted to contact the tape.

21. A sensing assembly as claimed in claim 20, wherein a display is provided thereon.

22. A sensing assembly as claimed in claim 21, wherein the display is activated by a read button.

23. A sensing assembly as claimed in claim 22, wherein a recharge unit is mounted on the cartridge.

24. A sensing assembly as claimed in claim 23, wherein a clamp is provided to clamp the tape into electrical contact.

25. For use in an electronic sensing assembly, a disposable and severable electrically conductive tape, a plurality of sensing probes mounted in said tape in spaced relationship to each other, said tape being severable at said probe to expose the probe and permit used tape portions to be discarded and permitting use of additional lengths of tape, whereby a fresh length of tape and a fresh probe can be used after severing the former length which was subject to a prior use.

26. A tape as claimed in claim 25, wherein said tape comprises a pair of conducting elements disposed lengthwise thereto and an insulating element electrically insulating the conducting elements.

27. A tape as claimed in claim 26, wherein each of said probes is in conducting relationship to said conducting elements.

28. A tape as claimed in claim 27, wherein severing lines are provided in the tape to permit the tape to be severed along these lines.

29. A tape as claimed in claim 28, wherein said severing lines follow the contour of said probe.

30. A tape as claimed in claim 29, wherein said severing lines are lines of weakness adapted to permit the tape to be severed therealong.

31. A tape as claimed in claim 27, wherein said conducting elements comprises a pair of laminated layers separated by an insulating layer.

32. A tape as claimed in claim 31, wherein severing lines are provided in the tape to permit the tape to be severed along these lines.

33. A tape as claimed in claim 32, wherein said severing lines follow the contour of said probe.

34. A tape as claimed in claim 33, wherein said severing lines are lines of weakness adapted to permit the tape to be severed therealong.

35. A tape as claimed in claim 27, wherein said conducting elements comprises a pair of conducting units imbedded within an insulating layer.

36. A tape as claimed in claim 35, wherein severing lines are provided in the tape to permit the tape to be severed along these lines.

37. A tape as claimed in claim 36, wherein said severing lines follow the contour of said probe.

38. A tape as claimed in claim 37, wherein said severing lines are lines of weakness adapted to permit the tape to be severed therealong.

* * * * *